(No Model.)
F. W. SMITH.
COMBINED FENDER AND CAR BRAKE.
No. 502,780. Patented Aug. 8, 1893.
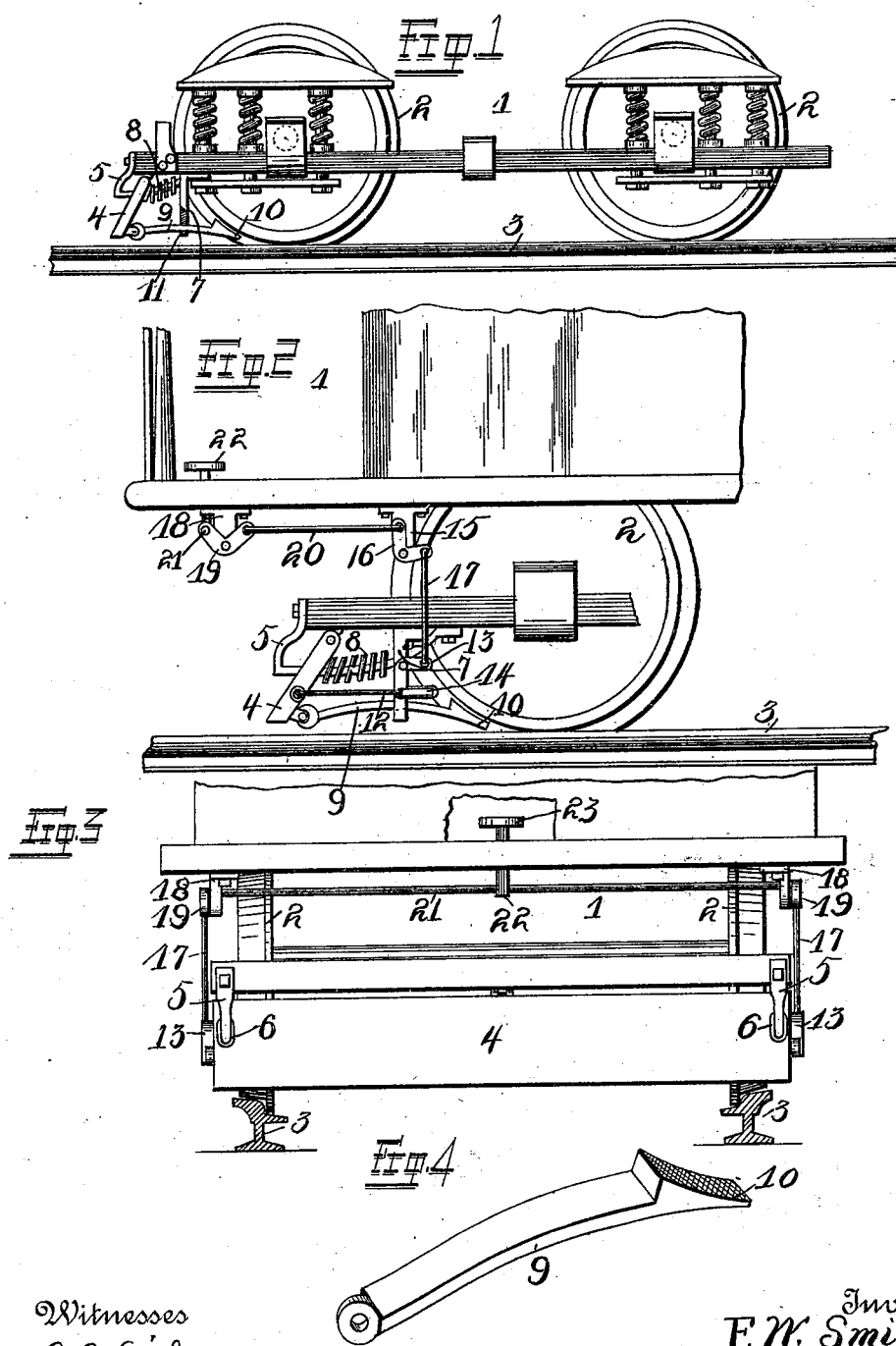
Witnesses
a. a. Eicks
[signature]
Inventor
F. W. Smith
By his Attorneys Hyden & Hyden & Longan

UNITED STATES PATENT OFFICE.

FRANK W. SMITH, OF ST. LOUIS, MISSOURI.

COMBINED FENDER AND CAR-BRAKE.

SPECIFICATION forming part of Letters Patent No. 502,780, dated August 8, 1893.

Application filed March 8, 1892. Serial No. 424,119. (No model.)

*To all whom it may concern:*

Be it known that I, FRANK W. SMITH, of the city of St. Louis and State of Missouri, have invented certain new and useful Improvements in a Combined Fender and Car-Brake, of which the following is a full, clear, and exact description, reference being had to the accompanying drawings, forming a part hereof.

My invention relates to improvements in "combined fenders and car-brakes," and consists in the novel arrangement and combination of parts, as will be more fully hereinafter described and designated in the claims.

In the drawings:—Figure 1, is a side elevation of a car truck having my invention applied thereto. Fig. 2, is a side elevation of a car and truck partially broken away showing my invention applied thereto, and also means for operating the same from the platform of said car. Fig. 3, is an end view of a car and truck with parts broken away showing the construction and arrangement of the parts, as illustrated in Fig. 2, and Fig. 4, is a perspective view of the wedge which I employ in connection with my invention, and adapted to be interposed between the wheels of the truck and the upper surface of the rails.

The object of my invention is to provide a car with a movable life-guard or fender which when struck by any obstacle will simultaneously and effectually stop the car by the application of a suitable brake hereinafter described whereby loss of life and limb is absolutely prevented.

My invention consists in attaching to said guard or fender suitable connections and appliances whereby the same may be operated from the platform of the car by any suitable person whereby the brakes may be applied when so desired without causing the said guard to be struck by an obstacle.

Referring to the drawings:—1, represents a car truck having the ordinary wheels 2, and 3, the usual rails upon which the said wheels are adapted to move.

The invention to be hereinafter described can be effectually applied to a car-truck of any height without materially altering the construction of the invention.

4, represents a fender or life-guard which is constructed of any suitable material, and is of such a length as to extend a little beyond the outer edges of the rails 3. The upper edge of said fender is hinged in any desirable manner to the under surface of the front end of the truck 1, the normal position of the said fender being at an incline as shown in the drawings, the lower edge of the same being elevated above the level of the rails.

5, represents two guide-rods, one end of which is attached to the front end of the car-truck, and the opposite ends attached to the under surface of the truck-frame at a suitable distance in rear of said end, which operate to guide the said former or guard when operated. 6, represents two openings which are formed in the said guard or fender near the ends of the same, through which the said guide-rods 5 loosely pass and said openings are somewhat elongated in order to allow sufficient space when the said guard or fender is moved. 7, represents angular guide-plates which are also secured to the under surface of the truck-frame, through which the guide-rods 5 also pass, and encircling said guide-rods and interposed between said plates in the rear surface of the guard or fender 4 are coil springs 8 which operate to hold the said guard or fender in an inclined position as shown in the drawings, and the remaining parts in a position to be operated.

9, represents two brake-levers which are suitably shaped one end of which is loosely attached to the lower rear edge of the guard or fender 4, and the opposite ends formed in the shape of wedges 10 as better illustrated in Fig. 4. Formed in the said plate 7—near the lower ends of the same, are suitable openings 11, through which the said brake levers 9 are adapted to be passed for guiding and holding the said levers in their proper position and relation to the wheels of the truck and the rails 3. When the guard or fender 4 is in its normal position the break-levers 11 will be out of contact with the wheels of the truck and the rails 3, but when pressure is applied to the front surface of the said fender or guard the wedge-shaped ends 10 of the said brake-levers will be brought in contact with both the said wheels and the said rail and operate to effectually stop the momentum of the wheel, without the application of any additional brake.

The device could be constructed to be easily applied to the ordinary brakes, that is, one in which the shoe is applied to the circumference of the wheel by a frictional contact therewith without materially altering the nature of my invention, but the present method of retarding the momentum of the truck-wheel is more prompt which is absolutely necessary in order to accomplish the objects intended for its use.

It will be readily understood from the foregoing description that when the fender or guard is struck by an object the brake-levers will be quickly operated with but very little pressure, and in consequence cause the wedge-shaped ends 10 to be interposed between the varying peripheral-surfaces of the car-wheel and the upper surfaces of the rails 3.

In order to apply the brakes from the platform of the car when it is desired to stop the said car, I employ the mechanism as I shall now proceed to describe. To one side of the fender 4 is loosely attached one end of a horizontal rod 12, and loosely attached to one side of one of the plates 7 nearest said end of the fender 4 is an angular arm 13, one portion of which is provided with an elongated opening 14 through which the opposite end of the horizontal rod 12 is adapted to be passed for allowing the same to be moved independent of the operating-device as hereinafter described when the fender 4 is struck by an object. 15, represents a bracket which is secured to the under surface of the car body, to the lower end of which is loosely attached an angular lever 16, and to one arm of said lever is loosely attached a vertical connecting rod 17, and the lower end of said rod loosely attached to one arm of the angular arm or lever 13. 18 represents a second bracket which is secured to the under surface of the car body near one end of the same and to which is loosely secured an angular lever 19. 20, represents a horizontal connecting-rod—one end of which is loosely attached to one arm of the angular lever 16 and the opposite end of which is loosely attached to one arm of the angular lever 19. 21 represents a horizontal transverse shaft which is attached to one arm of the angular lever 19 and leads across the car and attached to a similar lever and other devices constructed similarly to those just mentioned, as shown in Fig. 3. Loosely attached to the said shaft 21 intermediate of its length is a vertical rod 22 which passes through a suitable opening formed in the platform of the car, and secured to the upper end of said rod is a plate 23, which is adapted to be depressed by any person situated at that part of the car for applying the brakes. When the plate 23 is depressed by the foot the fender or guard 4 will be operated in such a manner as to cause the brakes to be immediately applied to both the wheels and the rails simultaneously.

Having fully described my invention, what I claim is—

1. A combined fender and car brake, consisting of a fender or guard, brake levers movably attached to said guard one end of which is adapted to be brought in contact with the rails and wheels of the car, guides for the said levers, and mechanism attached to the said fender for operating the same from the platform of the car, substantially as set forth.

2. A combined fender and car brake, consisting of a fender or guard, brake levers movably attached to the same, one end of which is adapted to be brought in contact with the wheels of the car and rails, guides for said levers, and a spring for releasing said brake levers, substantially as set forth.

3. A combined fender and car-brake consisting of a fender adapted to be movably attached to the truck of the car, brake-levers movably attached to the said fender or guard, guide-plates also secured to the said truck for holding and guiding the said brake-levers, and a spring or springs for holding the said guard or fender in its proper position and holding the said brake-levers out of contact with the wheels and the rails, substantially as described.

4. A combined fender and car-brake, consisting of a fender movably secured to the truck-frame of the car, guide-rods also secured to the said truck-frame and adapted to pass through suitable openings formed in the said fender for guiding the same, guide-plates 7 secured to the under-surface of the said truck, coil springs encircling said guide-rods and interposed between the said fender and plates, brake levers movably secured to the said fender and passed through suitable openings formed in the lower ends of the said plates, and wedges formed on the free ends of the said levers and adapted to be interposed between the wheels and the rails when pressure is applied to the front of the said guard or fender, substantially as described.

5. A combined fender and car-brake consisting of a guard or fender 4 movably secured to the truck-frame of the car, openings 6 formed in the said guard, guide-rods 5 secured to the said truck-frame, and adapted to pass through said opening 6, guide-plates 7 secured to the said truck-frame and provided with openings 11, coil-springs 8 encircling said guide-rod and interposed between the said plates and the said fender, brake-levers 9 rigidly attached to the said fender and adapted to be passed through the said openings 11, and wedges such as 10 formed on the free ends of the said levers and adapted to be brought in contact with the wheels and rails simultaneously for stopping the momentum of the car, substantially as described.

In testimony whereof I affix my signature in presence of two witnesses.

FRANK W. SMITH.

Witnesses:
C. F. KELLER,
ALFRED A. EICKS.